(12) United States Patent
Steele

(10) Patent No.: US 8,919,951 B2
(45) Date of Patent: Dec. 30, 2014

(54) CYCLING SAFETY GLASSES WITH REARVIEW MIRROR

(75) Inventor: Christopher M. Steele, Charlotte, NC (US)

(73) Assignee: Spello Holdings, LLC, Charlotte, NC (US)

(*) Notice: Subject to any disclaimer, the term of this patent is extended or adjusted under 35 U.S.C. 154(b) by 72 days.

(21) Appl. No.: 13/570,309

(22) Filed: Aug. 9, 2012

(65) Prior Publication Data
US 2014/0043580 A1 Feb. 13, 2014

(51) Int. Cl.
G02C 7/14 (2006.01)
G02C 5/00 (2006.01)
G02C 1/00 (2006.01)

(52) U.S. Cl.
USPC .................. 351/50; 351/41; 351/158

(58) Field of Classification Search
USPC ............................... 351/41, 50, 158
See application file for complete search history.

(56) References Cited

U.S. PATENT DOCUMENTS

| | | | |
|---|---|---|---|
| 1,467,358 A | 9/1923 | Borja et al. | |
| 1,892,365 A | 11/1930 | Rowan | |
| 2,175,896 A | 1/1938 | Jiranek | |
| 2,371,196 A | 11/1942 | Swan | |
| 3,609,015 A | 9/1971 | Messinger | |
| 3,988,058 A | 10/1976 | Chaney et al. | |
| 4,105,183 A | 8/1978 | Clark | |
| 4,349,246 A | 9/1982 | Binner | |
| 4,603,944 A | 8/1986 | Greenlaw et al. | |
| D286,395 S | 10/1986 | Greenlaw et al. | |
| 4,647,165 A | 3/1987 | Lewis | |
| 4,733,958 A | 3/1988 | Gorsich | |
| 4,798,454 A | 1/1989 | Hyun | |
| 5,048,943 A | 9/1991 | Allen | |
| D405,039 S | 2/1999 | Kiser | |
| 6,007,198 A | 12/1999 | Burton | |
| 6,893,124 B1 | 5/2005 | Kurtin | |
| 7,431,453 B2 | 10/2008 | Hogan | |
| 7,575,318 B2 | 8/2009 | Kux | |
| 2005/0001977 A1* | 1/2005 | Zelman | 351/57 |
| 2010/0039610 A1 | 2/2010 | Mauro | |
| 2011/0051273 A1* | 3/2011 | Tronvig | 359/876 |

FOREIGN PATENT DOCUMENTS

WO 9009611 A1 8/1990
WO WO 2007032636 A1 * 3/2007

* cited by examiner

*Primary Examiner* — Scott J Sugarman
*Assistant Examiner* — Mustak Choudhury
(74) *Attorney, Agent, or Firm* — Pedigo Law Firm, PLLC

(57) ABSTRACT

Safety glasses for experienced cyclists have a small diameter, unobtrusive, adjustable and removable mirror mounted thereon for establishing a rearwardly directed line of sight so that the cyclist can see a vehicle, including an automobile, motorcycle, or another cyclist, approaching from behind. The mirror is mounted on a stem that is magnetically attached to the gasses frame and extends forward from the frame. The magnetic attachment is sufficient to allow ready adjustment of the angle of incidence of light to establish the desired rearwardly directed line of sight and to fix the line of sight in place after adjustment. The glasses frame has a small disc-shaped neodymium magnet of from about 1 to 2 or 3 pounds force pull strength embedded in the face frame to the wearer's left and the mirror stem has a cooperating corresponding magnet mounted opposite the mirror. Larger mirrors may be desirable for use by less experienced cyclists.

20 Claims, 9 Drawing Sheets

CYCLING SAFETY GLASSES WITH REARVIEW MIRROR

FIELD OF THE INVENTION

The invention relates to eyewear having a rearview mirror associated therewith, and, more specifically, to rearview mirrors for mounting on eyewear, to eyewear frames for mounting of a rearview mirror thereon, and to assemblies of eyewear and rearview minors for sports, especially cycling.

BACKGROUND OF THE INVENTION

Road cycling in urban environments and on country roads poses unique hazards to the cyclist because of the presence of motorized vehicles, especially cars and trucks. In urban environments, the advent of bicycle lanes has helped alleviate somewhat the danger of being struck from behind by an approaching car or truck, although the prudent cyclist attempts to stay ever alert to automobile traffic. The lanes of county roads frequently have narrow shoulders and cars and trucks may approach less frequently and often at higher speeds demanding of the cyclist a vigilance that can sometimes detract from the enjoyment of the ride. The growing popularity of group cycling for races, charity rides, and for increased safety in cities and in the country has helped reduce crashes with motorized vehicles, although even an encounter with another approaching bicycle can be quite hazardous, particularly at the speeds achieved by modern experienced cyclists riding in close formation or whenever large groups of riders congregate.

In the past, minors or other optical viewing systems have been mounted on helmets and glasses to enable a cyclist to see what is approaching from behind. However, these systems typically are somewhat obtrusive and bulky, especially in their attachment to the cyclists' gear, may interfere with the cyclists' forward vision, and have generally not necessarily been widely adopted and used. It would be desirable to provide a less bulky and obtrusive rearview system for a cyclist, especially of the type that even an experienced cyclist would choose to wear and use, and that could provide a sufficient line of sight to indicate an approaching vehicle without providing an undue distraction to the cyclist or interference with their forward and peripheral vision.

SUMMARY OF THE INVENTION

The invention provides eyewear particularly suitable for use by cyclists as safety glasses, the eyewear having a rearview mirror adjustably and removably fixed to the eyewear frame and comprising a mirrored surface and a stem affixed at one end to the mirrored surface that extends generally from the mirrored surface to the eyewear frame, the stem magnetically and rotatably attached to the frame for adjustment of the angle of incidence of light, whereby the wearer can fixedly adjust the rearward line of sight for viewing objects approaching from behind. The magnetic attachment is sufficient to fix the rearwardly directed line of sight and yet provide for ready hand adjustment of the viewing angle by hand by rotating the stem between adjustments. The magnets used in connection with the invention typically are standard, commercially available, powerful and cylindrical rare earth magnets. One example is a small, lightweight, neodymium disc-shaped magnet of the type widely sold for a variety of commercial purposes, including securing name tags on clothing. The rearview minor is easily removable for separate storage or for use of the eyewear in the absence of the rearview minor whenever desired. The eyewear is also more generally useful for those applications in which a rearview minor is desirable and so has utility beyond cycling where eyewear with rearview capability is desired.

In one embodiment of the invention, a magnet is affixed to the eyewear frame by embedding the magnet in the eyewear frame, which is normally made of plastics. The magnet normally is affixed to the eyewear frame on the wearer's upper left hand side of the face frame, between the earpiece hinge and the left lens. Cyclists in the United States generally travel on the right hand side of the road in the same direction as motorized traffic, which mean the mirror is usefully placed on the cyclist's left to view approaching traffic. It should be apparent that the eyewear and mirror can easily be adapted for locating the rearview minor of the invention on the opposite right hand side where desired.

The invention includes the eyewear frame having the magnet affixed thereto for mounting of the mirror, the rearview minor itself, which can be sold as a separate item for use in combination with the eyewear frame, and the combination of the eyewear and minor. In one embodiment of the invention, the rearview minor comprises a reflective surface, a stem by which the reflective surface extends from the eyewear frame a distance to establish a rearwardly directed line of sight for the cyclist, and a magnet fixed to the stem opposite the reflective surface matched to the magnet affixed to the eyewear frame for adjustably fixed magnetic attachment of the minor to the eyewear frame, the stem magnet cooperating with and magnetically affixing the minor to the eyewear frame magnet. The pair of magnets are sufficiently powerful for use without significantly increasing the weight of the glasses. A typical pull strength balanced between sufficient holding strength and ease of removal of the minor from the eyewear frame is from about 1 to 2 or even 3 pounds force in a disc-shaped magnet of about a ¼ inch or so in diameter.

Thus, in a somewhat more specific embodiment, the invention includes a small and unobtrusive mirrored surface mounted in a mirror frame, a stem attached to the minor frame for attaching the minor at its opposite end to a cycling safety glasses frame, and a disc-shaped neodymium magnet of about 1 to 2 pounds force pull strength mounted to the end of the stem opposite the minor for affixing the minor to the eyeglass frame. The invention also includes a pair of eyeglasses having plastic eyewear frames of the type used for sporting activities, including cycling, and that have been modified so that a rare earth magnet corresponding to that mounted to the minor stem is embedded within the frame where it is desired to attach the mirror.

BRIEF DESCRIPTION OF THE DRAWINGS

FIG. 4b illustrates rotatable adjustment of the angle of incidence of light upon the minor; FIG. 4c illustrates the range of rotatable adjustment; FIG. 5a illustrates a magnet mounted on the frame; 5b illustrates the magnet further embedded into a plastic frame; and FIG. 5c illustrates the magnet embedded into the frame sufficient to cover with plastic or for direct face-to-face contact with a cooperating magnet on the mirror stem.

Corresponding reference characters indicate corresponding parts throughout the several views of the drawings; generally speaking, parts of the right hand side of the eyewear correspond to left hand parts and the corresponding right hand parts are indicated with primes.

DETAILED DESCRIPTION OF THE INVENTION

Figure 1:
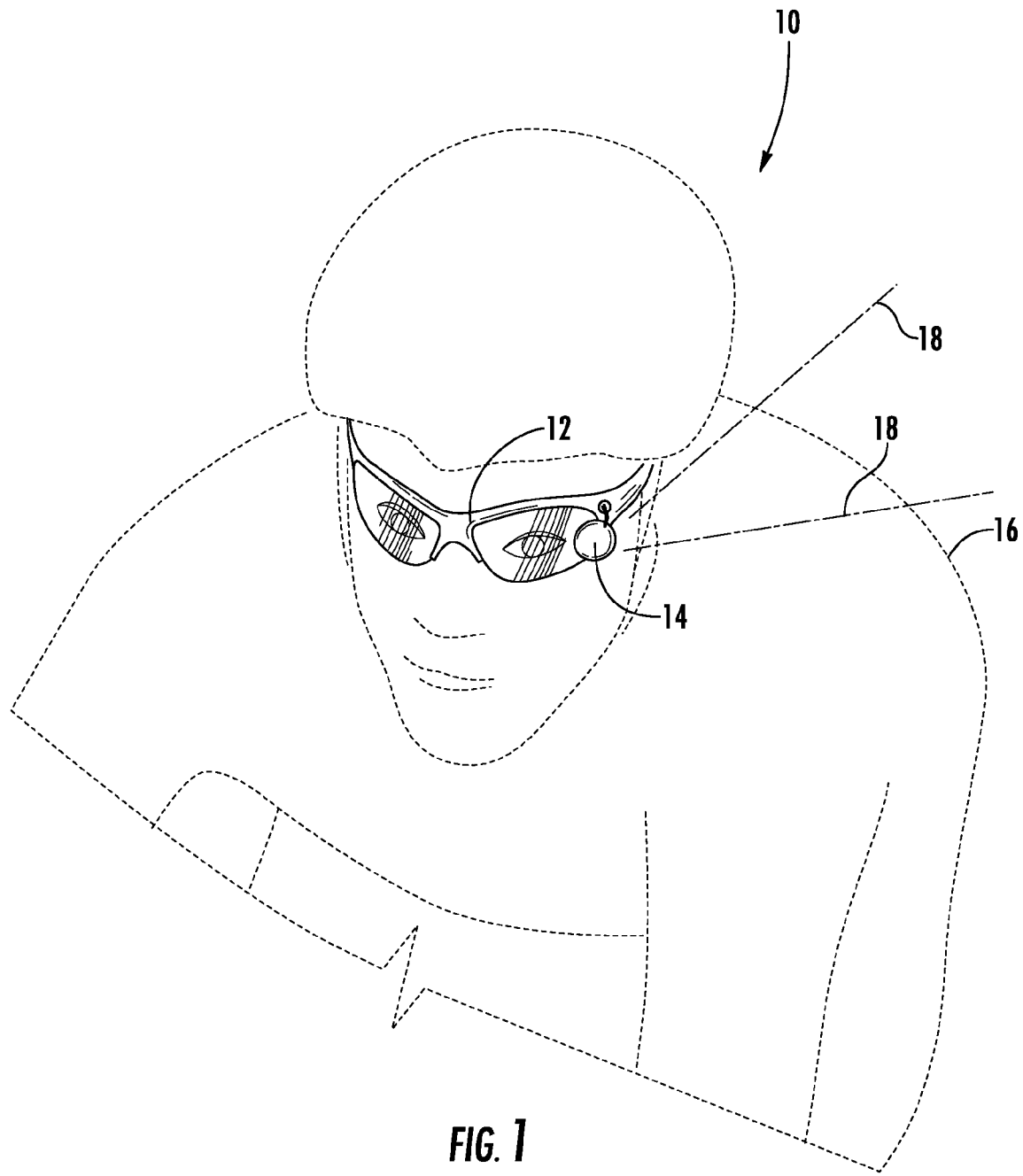
FIG. 1 is an environmental perspective view illustrating a cyclist, in dashed lines, wearing safety glasses of the invention having a rearview mirror mounted thereon, in solid lines, and demonstrating a context of use of the invention.

This invention can best be understood with reference to the specific embodiments that are illustrated in the accompanying drawings and the variations described below. While the invention will be so described, it should be recognized that the invention is not intended to be limited to the embodiments illustrated in the drawings; rather, the embodiments provided in this disclosure are intended to satisfy applicable legal requirements. The invention includes all alternatives, modifications, and equivalents that may be included within the scope and spirit of the invention as defined by the appended claims.

FIG. 1 illustrates generally at 10 a perspective view of one embodiment of the invention of eyewear 12 having a rearview mirror 14 affixed to the eyewear, the invention shown in solid lines, in the context of the use of the invention by a road cyclist, illustrated in dashed lines at 16. The eyewear in this context is a pair of cycling safety glasses sometimes referred to as "blades," having interchangeable polycarbonate high-impact lenses of different colors that snap into and out of retaining tracks in a plastic frame. The rearview mirror 14 is fixedly adjustable, removable, and magnetically attached to the glasses frame, in accordance with the invention. The mirror is fixedly adjustable in that the mirror generally remains in place between adjustments or prior to removal. Placement of the mirror 14 provides a rearwardly directed line of sight to the cyclist, indicated by a pair of dashed lines 18.

Figure 2:
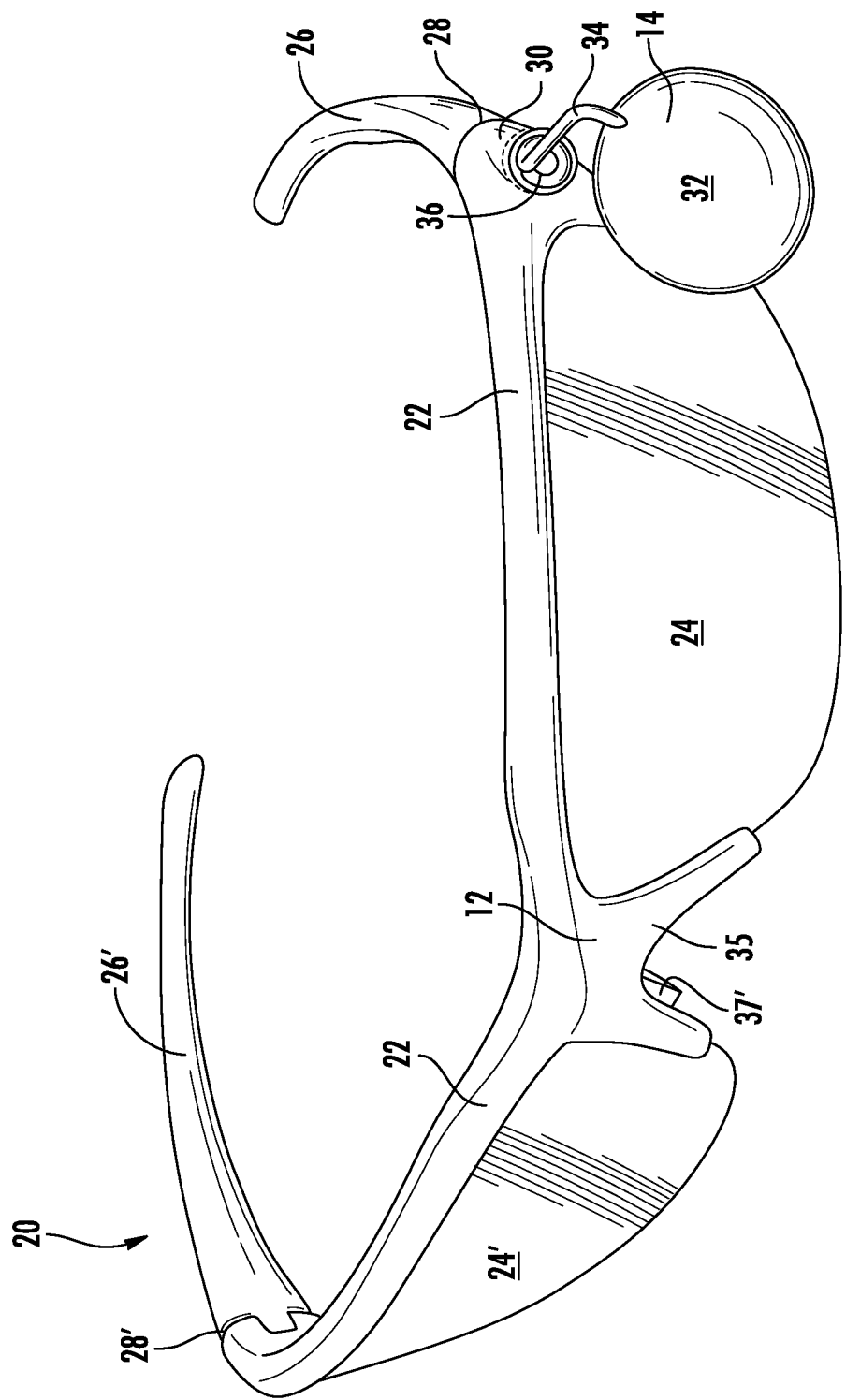
FIG. 2 is a front perspective view illustrating the safety glasses of FIG. 1.

FIG. 2 illustrates in perspective and generally at 20 a view of the glasses 12 of the invention as illustrated in FIG. 1, but enlarged for detail and isolated from the wearer. A mirror 14 in accordance with the invention is mounted on the upper left hand corner of the face frame 22 adjacent the upper left corner of left lens 24 and intermediate the left lens and the ear piece 26. The face frame 22 defines left and right lens retaining portions corresponding to left and right lenses 24 and 24' that typically contain a slot, not shown, for releasably securing the lenses so that different colored lenses can be interchanged, depending on cycling conditions.

Rearview mirror 14 comprises a back portion 32, which is a frame for a reflective surface. The reflective surface is not shown in this view as that surface is hidden from view and faces in the opposite direction from that of the viewer. The mirror back portion and the reflective surface are normally circular, although it should be recognized that a rectangular or square or other shape could be used if desired. Mirror 14 also comprises a stem 34 attached to back portion 32 along an upper edge thereof. Stem 34 elevates the mirror above the lenses 24, 24' of the eyewear 12 in a direction forward of the viewer so as to establish the rearwardly directed line of sight. The stem 34 is turned at the end distal from the mirror frame 32 so as to form a base 36 by which the stem is secured at its base.

The stem can be prepared and selected in a variety of lengths depending on the style of eyewear frame selected, the size of the reflective surface, and a number of other factors, including rider preference. It is intended that the mirrors can be manufactured and sold in a variety of styles and sizes to accommodate personal preference and eyewear styles. For example, the stem typically may be about 1 inch in length or could vary from about ½ inch to 1½ or even 2 inches, as needed and useful.

The eyewear with face frame 22 and left and right lenses 24 and 24' is conventional, but for the embedded magnetic fitting in the built up area 30, and includes in addition to the face frame 22, ear pieces 26 and 26', and lenses 22 and 22', a nose bridge 35 to which nose pads 37 and 37' are attached. The nose bridge and ear pieces cooperate to support the face frame and lenses on the wearer's face in a conventional manner. The magnets are of lightweight and high performance and so do not require modification of the frame other than to accommodate affixing the magnet.

Ear pieces 26 and 26' are hingedly connected at 28 and 28', respectively, to face frame 22 in a conventional manner so that the ear pieces may be folded when not in use. A portion of the face frame adjacent the hinge 28 has been built up at 30 to accommodate a small magnet 46 (FIG. 3), preferably disc-shaped, by which rearview mirror 14 can be affixed to the eyeglass frame.

It should be recognized that the blade style glasses illustrated in the drawings, modified in accordance with the invention to include a magnet 46 (FIG. 3), are but one style of popular safety glasses. Other styles may include a single lens that extends across both eyes, and these can also be made interchangeable and to snap into and out of a lens retaining track in the frame. The invention is of more general applicability and may be used with a variety of glasses styles, although typically with frames made of plastics to enable embedding a magnet in the frame. It should be recognized that other frame materials may be selected and the magnets used in connection with the invention affixed by other means. For example, magnet 46 may be affixed to a metal frame using a suitable adhesive as is the corresponding magnet 44 (FIG. 3) affixed to mirror stem 34. Suitable adhesives include epoxies and cyanoacrylates, including Superglue®, although a wide variety of adhesives may also be suitable.

A wide variety of permanent magnets are commercially available made from an equally wide variety of ferromagnetic materials and may be suitable for use in the practice of the invention. Powerful, compact, light-weight rare earth magnets are particularly useful. Neodymium rare earth magnets are widely available in a variety of shapes. Disc-shaped short cylinders are particularly useful in the practice of the invention and can be selected in sizes from $\frac{1}{8}^{th}$ inch in diameter to $\frac{3}{8}^{ths}$ inch and in a thickness of from 0.05 to 0.1 inch. Pull strengths for neodymium magnets in this size range can be obtained from 0.8 to nearly 4 pounds and as used in the practice of the invention should be from 1.0 to 3.0 pounds force, more typically from about 1.0 to 2 pounds force, and most typically about 1.5 pounds force. In the practice of the invention, the magnet should be selected in a size that can easily be accommodated into the eyewear frame and at a pull strength that secures the mirror for normal use and provides for easy rotational adjustment by hand and removal from the eyewear frame. For example, a disc shaped magnet of about 6 mm diameter and from 1.5 to 2 mm in thickness is available in a pull strength of from about 1.5 to 3 pounds force (7 to 13 Newtons). One suitable such magnet measured at 2.1 pounds force (9.3 Newtons).

It should be recognized that neodymium magnets, also called "NEO" magnets, typically are constructed from alloys, usually including iron and boron in addition to neodymium, and that other rare earth metals and alloys of rare earth metals can be used to manufacture suitable light weight and powerful magnets, although some of these may not be so readily available. Other metals and composites than rare earth metals, including other ferromagnetic metals such as, for example, niobium and others, can be used to make permanent magnets for use in the practice of the invention as well, although not necessarily with equivalent results.

Figure 3:
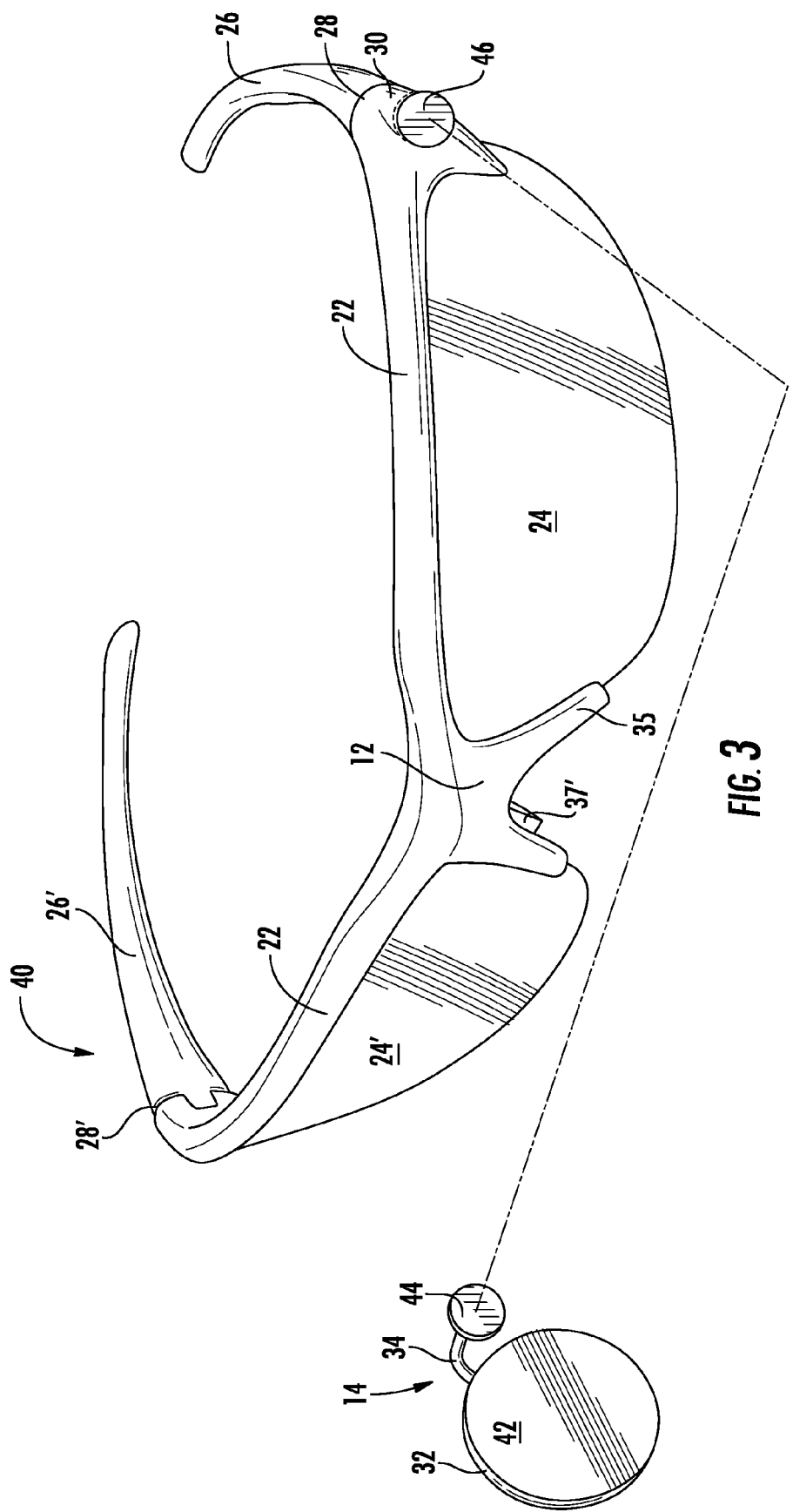
FIG. 3 is an exploded perspective view illustrating the rearview mirror's magnetic mounting attachment to the safety glass frame.
Figure 5A:
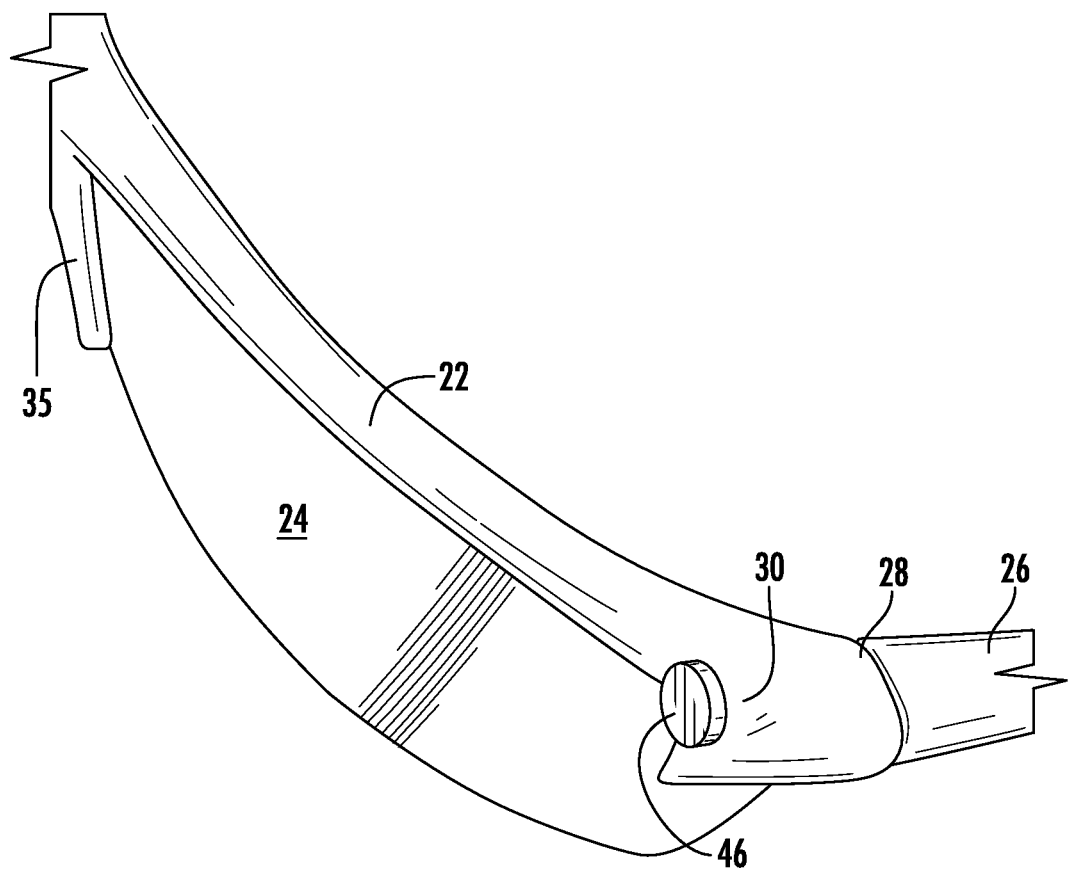
FIGS. 5a, 5b, and 5c are partial side perspective views illustrating the location and affixing of magnets to the eyeglass frame in the wearer's upper left, the magnet embedded in the face frame of the glasses adjacent the hingedly connected left earpiece and intermediate the left earpiece and the upper portion of the left lens.

Turning now to FIG. 3, FIG. 3 illustrates the glasses of FIG. 2 in a partially exploded perspective view to show the connection of rearview mirror 14 to the glasses face frame 22. In this exploded view, the mirror can be seen from the reflective surface side 42 mounted and secured in minor frame 32 to which stem 34 is connected. Stem 34 is secured opposite the mirror frame 32 via turned stem portion 36 (FIG. 2) to a cylindrical or disc shaped rare earth or other suitable magnet 44, most commonly neodymium for magnetic attachment to a corresponding magnet 46 that is affixed to face frame 22. Magnet 46 as shown in FIG. 3 is embedded in the glasses face frame 22 and protrudes forwardly of the face frame to a slight extent, as shown in FIG. 5a, providing a flush mounting surface for magnet 44. Magnets 44 and 46 should correspond in polarity and strength for removably securing magnetic attachment of the minor 14 to the eyewear 22 and for fixed adjustment of the position of the minor 14 so as to establish an adjustable rearwardly directed line of sight. By "removably securing" is meant that the magnetic attachment of one magnet to another should be sufficient to secure the mirror in place on the eyewear during normal and intended use and yet the mirror should be removable by hand when desired to do so. By "fixed adjustment" is meant that the assembly of minor frame 32, reflective surface 42, stem 34, and magnet 44 can be rotated by hand and in combination to change the rearwardly directed line of sight, but will maintain a fixed line of sight absent such intentional rotation (FIG. 1, dashed lines 18).

Figure 4A:
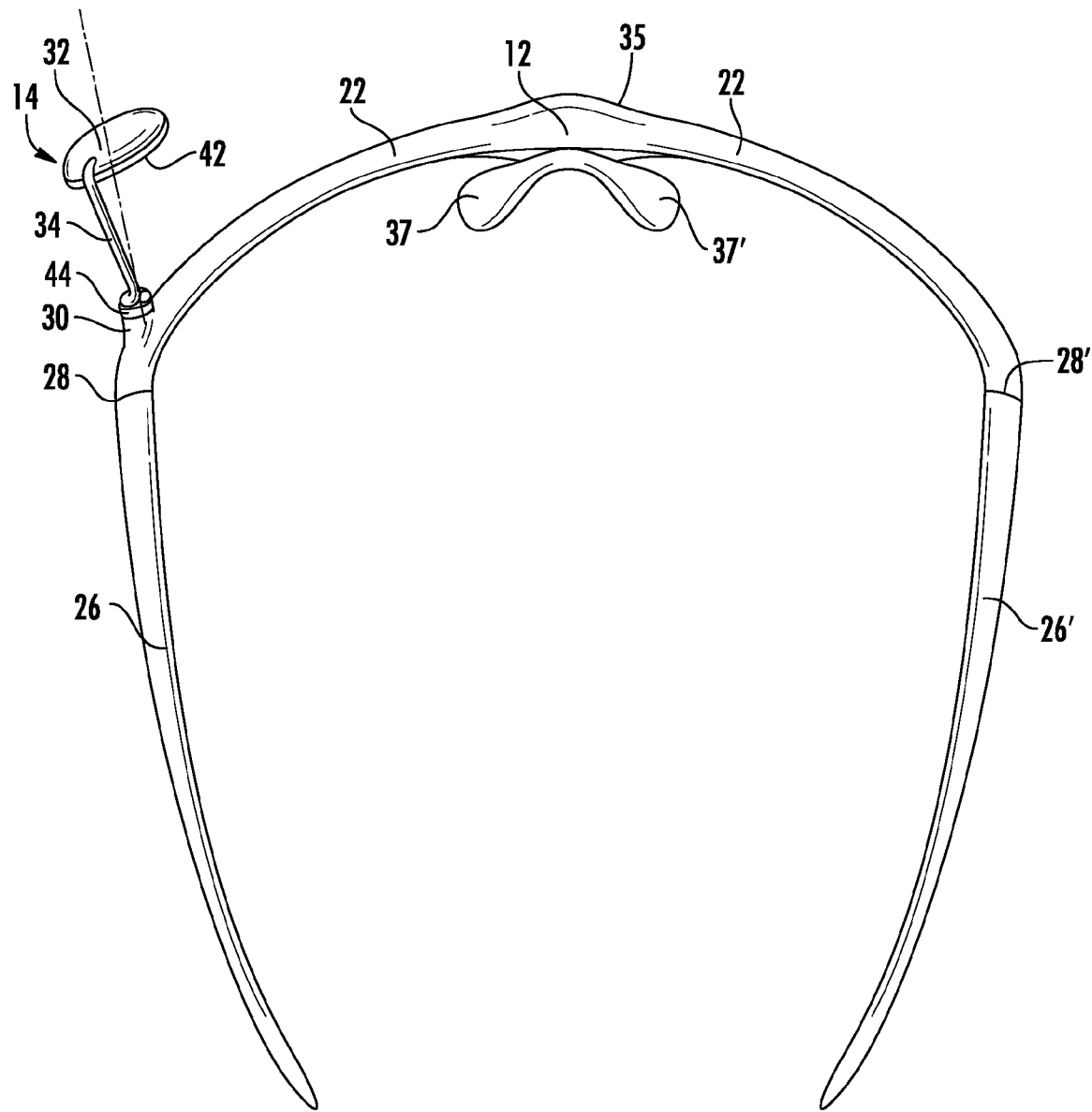
FIGS. 4a, 4b, and 4c are top plan views illustrating the safety glasses of FIG. 1.
Figure 4B:
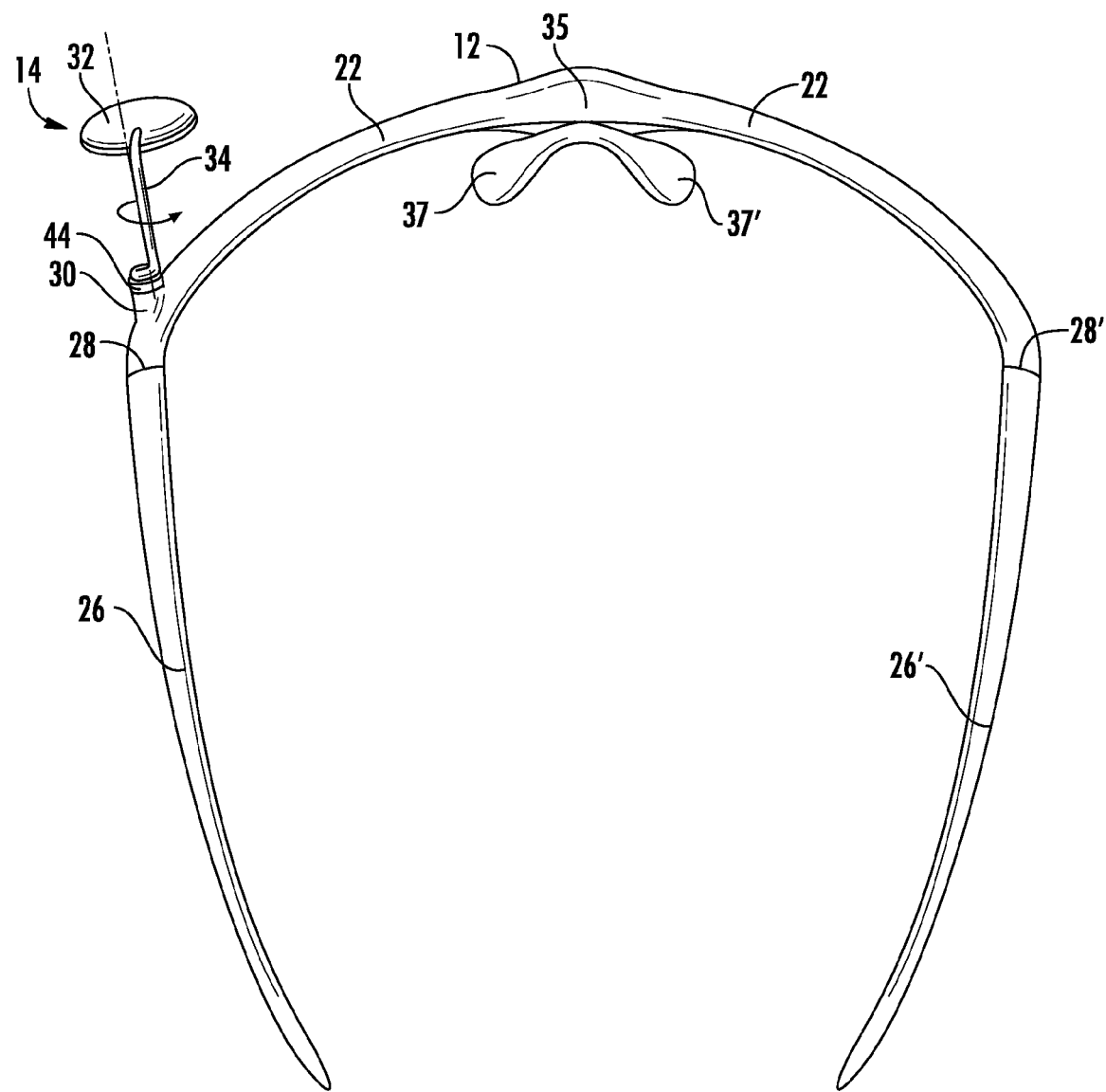
Figure 4C:
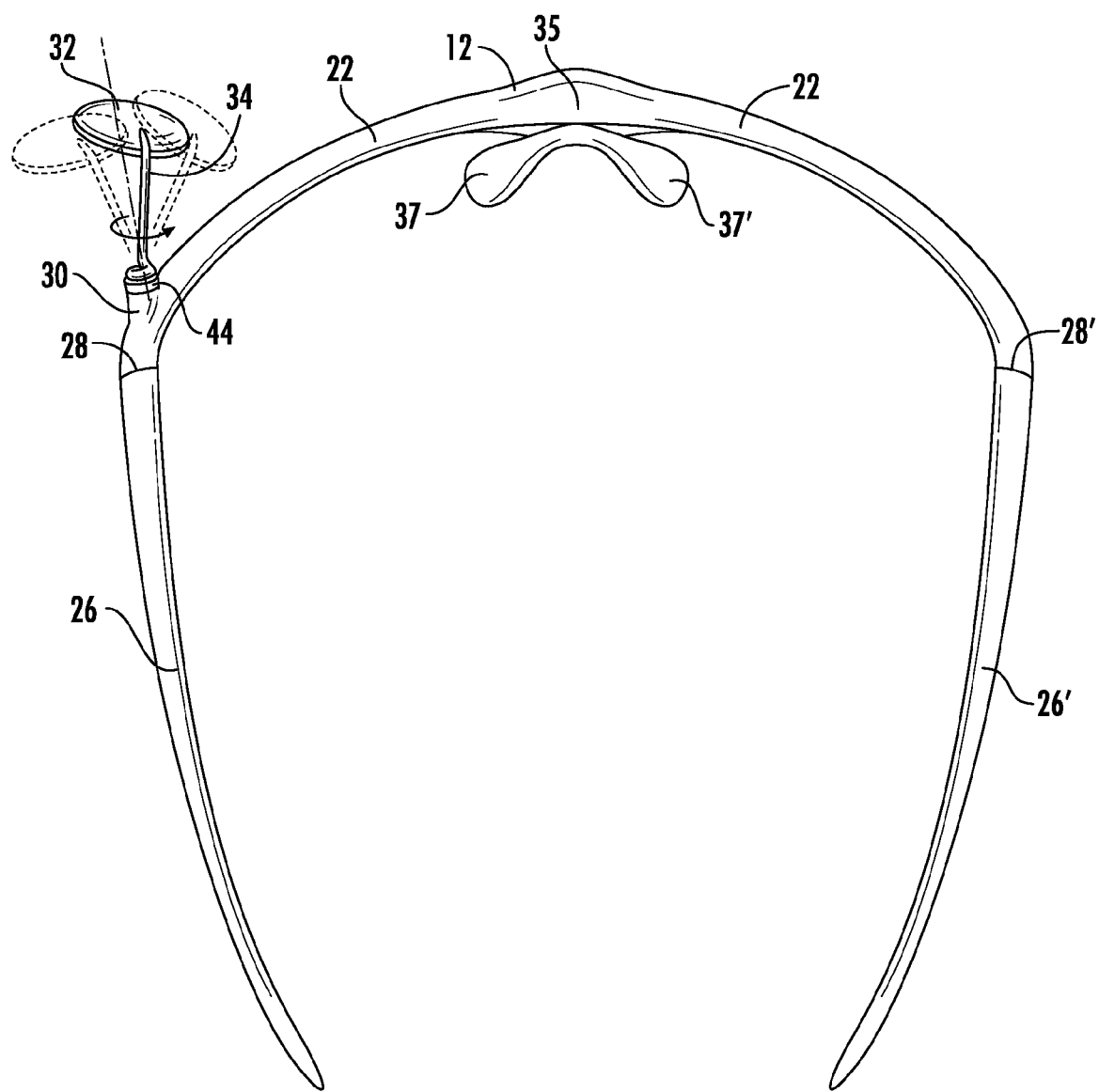

FIGS. 4a through 4c illustrate the glasses of FIG. 2 in top plan view and the minor generally at 14 with the stem and magnet combination 34, 44 magnetically affixed to the frame face 22 adjacent the hinge 28 for ear piece 26. The stem places the reflective surface 42 of the mirror 14, which cannot be seen directly in the top plan view, forward of the cyclist for establishing a rearwardly directed line of sight for viewing behind the cyclist. FIG. 4a shows the mirror mounted in place; FIG. 4b shows an arrow around the mirror stem to illustrate rotating the mirror by hand and for adjustment of the angle of sight. FIG. 4c illustrates in shadow multiple positions that can be achieved to adjust the line of sight.

Figure 5B:
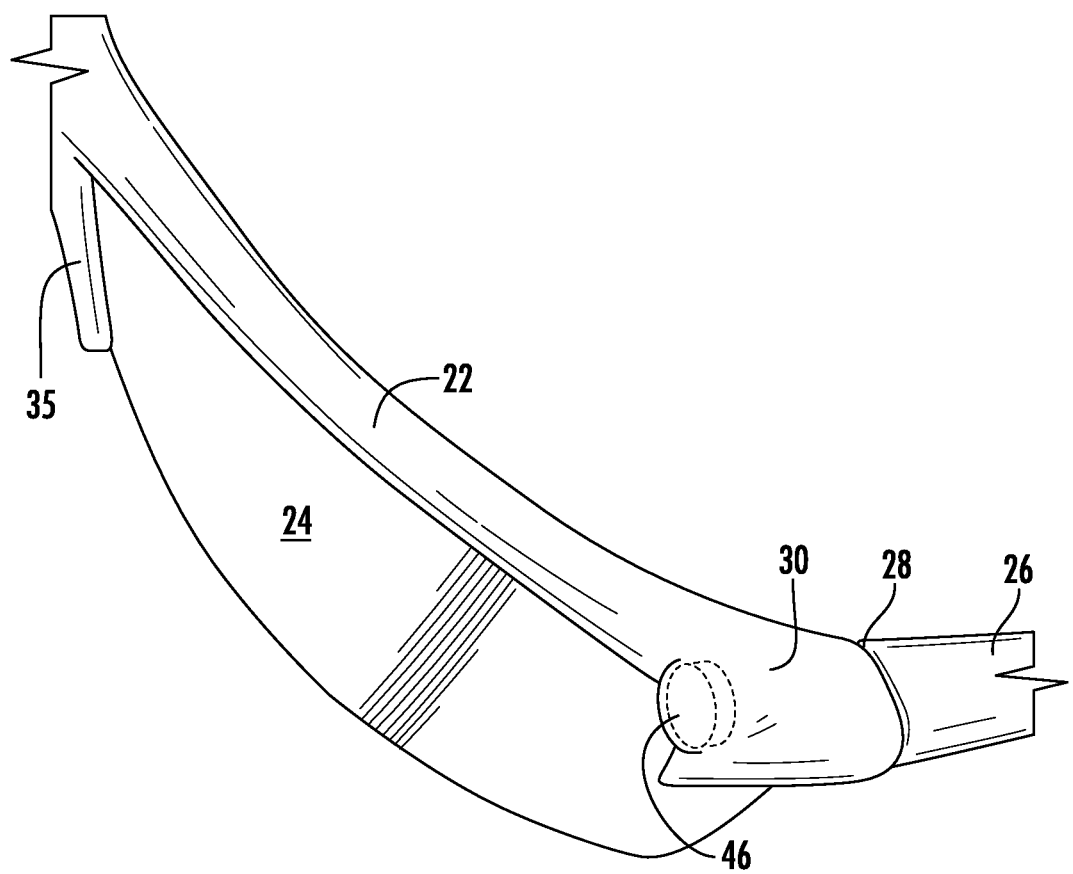
Figure 5C:
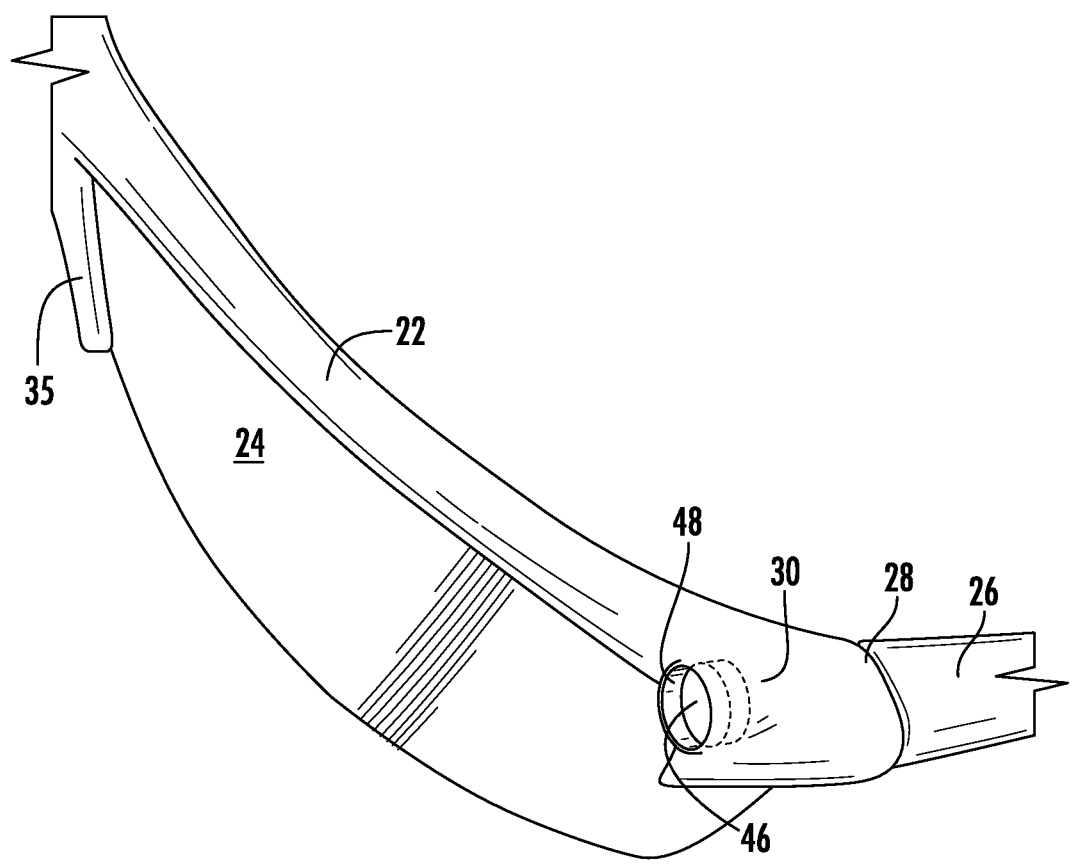

FIGS. 5a, 5b, and 5c are partially broken away perspective views of the eyewear of the invention with the minor removed and with the magnet 46 placed at various embedded depths in the frame. In FIG. 5a, the flat surface for the magnet protrudes forward of the eyewear frame to engage the magnet mounted to the minor. In FIG. 5b, the magnet is hidden sufficiently to be covered with a small amount of frame material and still maintain the magnetic connection with the stem and magnet combination. FIG. 5c illustrates the magnet 46 further embedded into the face frame 22, the face frame defining an open channel 48 over the magnet for secure receiving contact of a magnet 44 mounted on the mirror stem 34 (FIG. 4a) with the embedded magnet 48, the mirror stem magnet 44 extending into the face frame to contact the face frame magnet 48 when the minor 14 and face frame 22 (FIG. 4a) are assembled in combination.

The invention is particularly useful as eyewear for cycling safety glasses and normally includes interchangeable lens pairs that may be prescription or non-prescription. Thus, in one embodiment, the eyewear of the invention has a rearview mirror 14 mounted thereon for enabling the wearer to view objects behind them. The eyewear includes a frame 12 for retaining a pair of lenses 24 and 24' on the face. The frame comprises a face frame 22 that has a centrally located nose bridge 35, a lens retaining portion on each side of the nose bridge, and a pair of earpieces 26 and 26' extending generally rearwardly from the face frame for wearing the frame, the bridge and earpieces cooperating so as to retain the frame on the wearer's face. A magnet 46 (FIG. 3) is affixed to the face frame 22 adjacent earpiece 26.

The eyewear includes a pair of lenses 24 and 24', one in each lens retaining portion of the face frame 22; and a minor 14 adjustably mounted to the eyewear frame and extending generally forward from the face frame to enable the wearer to establish an adjustably fixed and generally rearwardly directed line of sight 18 (FIG. 1) reflected in the minor, thereby enabling the wearer to view objects behind them. The mirror 14 comprises a mirrored surface 42 (FIG. 3) and a stem 34 affixed at one end to the mirrored surface. The stem extends generally from the mirrored surface to the eyewear frame 22 and is magnetically and rotatably affixed to the magnet 46 (FIG. 3) affixed to the frame for adjustment of the angle of incidence of light whereby the wearer can adjust the rearward line of sight for viewing objects behind them. The mirrored surface 42 is about ¼ to ½ inch in diameter and is a reflector mounted in a frame 32. The stem 34 is affixed to the reflector frame and extends about 1 inch from the reflector frame to the magnet 46 affixed to the eyewear frame.

The minor includes a magnet 44 affixed to the stem 34 opposite the mirrored surface 42 and magnetically cooperating with the magnet 46 affixed to the frame to adjustably retain the mirror mounted to the eyewear frame. The magnet 46 may provide direct fact-to-face magnetic retaining contact with the minor 14 or may be covered with plastic. Typically the magnets 44 and 46 are rare earth magnets, especially neodymium because of its ready availability, and are cylindrical or disc-shaped. The magnet 46 typically is affixed to an upper portion of the face frame 22 intermediate an earpiece 26 and an upper portion of a lens retaining portion of the face frame 22 opposite the nose bridge 35. In this location, the mirror 14 may be attached for use in connection with lens 24. However, in other circumstances, the magnet 46 could be mounted on an upper portion of the face frame 22 intermediate an earpiece 26' and an upper portion of a lens retaining portion of the face frame 22 opposite the nose bridge 35, for use in connection with lens 24'. Normally, magnet 46 is embedded in the frame, though if the frame is made of a material other than plastic, the magnet may be affixed to the surface of the frame.

In another embodiment, cycling safety glasses 12 have a rearview minor 14 removably mounted thereto to enable the wearer to ascertain the presence of vehicles approaching them from behind. The glasses comprise a plastic frame for retaining a pair of lenses on the face. The frame comprises a face frame 22 having a centrally located nose bridge 35, lens retaining slots on each side of said nose bridge, and a pair of earpieces 26 and 26' hingedly extending from the face frame, the bridge and earpieces cooperating so as to retain the frame by contact with the nose and ears of the wearer. The frame also includes a disc-shaped rare earth magnet 46 affixed within an upper portion of the face frame to the wearer's left and adjacent an upper portion of a lens slot intermediate the lens slot and the left earpiece 26, a pair of lenses 24 and 24' in lens slots, one lens on each side of the nose bridge 35, and a minor 14 adjustably mounted to the glasses frame 22 and extending generally forward of the glasses so as to enable the wearer to establish a rearwardly directed line of sight reflected in the mirror (lines 18, FIG. 1), thereby enabling the wearer to ascertain the presence of vehicles approaching from behind.

The minor 14 includes a mirrored surface 42 mounted in a frame 32, a stem 34 mounted on one end thereof to the minor frame 32 and extending generally from the minor frame to the eyewear face frame 22, and a disc-shaped rare earth magnet 44 affixed to the minor stem 34 opposite the mirrored surface 42 and magnetically cooperating with the magnet 46 affixed to the glasses frame to rotatably and removably retain the mirror 14 mounted to the glasses frame 22. The minor rotatably engages the magnet affixed to the glasses frame, thereby providing for hand adjustment of the rearwardly directed line of sight reflected in the minor.

In a more specific embodiment directed to the mirror portion of the invention, the invention includes the rearview minor 14 for rotatably mounting to a pair of eyeglasses 12 and providing for hand adjustment of a rearwardly directed line of sight 18 reflected in the minor. The minor includes a mirrored surface 42 and a stem 34 affixed on one end thereof to the mirrored surface and extending a distance sufficient to establish an adjustable rearwardly directed line of sight 18 reflected in the mirror when rotatably mounted in magnetically cooperating engagement on a pair of eyeglasses having a magnet affixed.

More specifically, the rearview minor 14 includes a magnet 44 affixed to the stem opposite the mirrored surface 42 for magnetically cooperating with an eyeglasses frame 12 for magnetically engaging the mirror. The minor is fixedly and rotatably adjustably mounted to a pair of eyeglasses, thereby providing for hand adjustment of the rearwardly directed line of sight reflected in the mirror. The rearview mirror is about ¼ to ¾ inch in diameter and comprises a reflector 42 mounted in a reflector frame 32. A stem 34 is affixed to the reflector frame 32 and extends about 1 inch from the reflector frame to the magnet 46 affixed to the eyeglasses frame. Stem lengths of from 1.2 to 2 inches may be desirable depending on minor diameter, glasses and helmet styles, and the like.

In yet another specific embodiment directed to the eyewear frame 12 of the invention, an otherwise conventional eyewear frame has been modified to provide for magnetic mounting thereon of a rearview mirror 14. The eyeglass frame includes a face frame 22 having a centrally located nose bridge 35, a lens retaining portion on each side of said nose bridge 35, and a pair of earpieces 26 and 26' extending from the face frame 22, the face frame, bridge, and earpieces cooperating so as to retain the frame by contact with the nose and ears of the wearer. A magnet 46 affixed to the frame in an upper outer portion of the face frame adjacent the ear piece 26 engages the rearview minor 14 in magnetically retaining relation, thereby to establish an adjustably fixed and generally rearwardly directed line of reflected sight whereby wearer may view objects behind them.

It should be understood that the invention is illustrated in the context of a specific use and is of more general applicability within the scope of the appended claims.

What is claimed is:

1. Eyewear having a rearview mirror mounted thereon for enabling the wearer to view objects behind them, the eyewear and rearview mirror comprising, in combination, an eyewear frame having a magnet affixed thereto for mounting a rearview mirror and a rearview mirror magnetically mounted to the eyewear frame, the rearview mirror comprising a mirrored surface and a supporting stem affixed at one end to the mirrored surface and at the other end to the eyewear frame, the stem magnetically and rotatably affixed in removably secured flush mounted relationship to the eyewear frame magnet, whereby the wearer establishes in the mirrored surface a rearwardly directed and fixedly adjustable line of sight to view objects behind the wearer reflected in the mirrored surface and can remove the rearview mirror from the eyewear frame when not in use.

2. The eyewear of claim 1 wherein the rearview mirror further comprises a magnet affixed to the stem opposite the mirrored surface and magnetically cooperating with the magnet affixed to the eyewear frame in removably secured flush mounted relationship to fixedly and adjustably mount the rearview mirror to the eyewear frame.

3. The eyewear of claim 1 wherein the eyewear frame comprises a face frame and earpieces and the eyewear frame magnet is affixed to an upper portion of the face frame adjacent an earpiece so that the mirror extends generally forward of the face frame to establish a rearwardly directed line of sight.

4. The eyewear of claim 3 wherein the magnet affixed to the eyewear frame is embedded in the frame.

5. The eyewear of claim 4 wherein the frame is made of plastic and the magnet affixed to the eyewear frame is embedded within the plastic for magnetic retaining contact with the mirror.

6. The eyewear of claim 4 wherein the frame is made of plastic and the magnet affixed to the eyewear frame is embedded within the plastic for direct fact-to-face magnetic retaining contact with the mirror.

7. The eyewear of claim 1 wherein the mirror is located on the wearer's left.

8. The eyewear of claim 1 wherein the magnet is a rare earth magnet.

9. The eyewear of claim 1 wherein the magnet is a neodymium magnet.

10. The eyewear of claim 1 wherein the magnet is cylindrical in shape.

11. The eyewear of claim 1 wherein the magnet is disc-shaped.

12. The eyewear of claim 1 wherein the mirrored surface is about ¼ to ½ inch in diameter and comprises a reflector mounted in a frame and wherein the stem is affixed to the reflector frame and extends about 1 inch from the reflector frame to the magnet affixed to the eyewear frame.

13. The eyewear of claim 1 wherein the eyewear constitutes a pair of cycling safety glasses.

14. The eyewear of claim 1 wherein the eyewear further comprises interchangeable lens pairs that may be prescription or non-prescription.

15. Eyewear having a rearview mirror mounted thereon for enabling the wearer to view objects behind them, the eyewear and rearview mirror comprising, in combination:
    a. an eyewear frame, the frame comprising a face frame and a pair of earpieces extending generally rearwardly from the face frame for wearing the eyewear frame, the face frame and earpieces cooperating so as to retain the eyewear frame on the wearer's face;
    b. a magnet affixed to the face frame adjacent an earpiece; and
    c. a mirror adjustably mounted to the eyewear frame and extending generally forward from said face frame so as to enable the wearer to establish an adjustably fixed and generally rearwardly directed line of sight reflected in the mirror, thereby enabling the wearer to view objects behind them, the mirror comprising:

i. a mirrored surface;

ii. a stem affixed at one end thereof to the mirrored surface and extending generally therefrom to the face frame; and, iii. a magnet affixed to the stem opposite the mirrored surface and magnetically cooperating in flush mounted relation with the magnet affixed to the face frame to rotatably and removably retain the mirror mounted to the eyewear frame, thereby providing for hand adjustment of the rearwardly directed line of sight reflected in the mirror.

16. The eyewear of claim 15 wherein the magnet is a rare earth magnet.

17. The eyewear of claim 15 wherein the magnet is a disc-shaped neodymium magnet.

18. The eyewear of claim 15 wherein the magnets have a pull strength of from 1.0 to 2.5 pounds force.

19. The eyewear of claim 15 wherein the mirrored surface is about ¼ to ½ inch in diameter and comprises a reflector mounted in a frame and wherein the stem is affixed to the reflector frame and extends about 1 inch from the reflector frame to the magnet affixed to the eyewear frame.

20. A rearview mirror for rotatably mounting to a pair of eyeglasses, thereby providing for hand adjustment of a rearwardly directed line of sight reflected in the mirror, the eyeglasses having a magnet affixed to a frame thereof for magnetically engaging the mirror, the mirror comprising:

a. a mirrored surface;

b. a stem affixed on one end thereof to the mirrored surface and extending therefrom a distance sufficient to establish an adjustable rearwardly directed line of sight reflected in the mirror when rotatably mounted in magnetically cooperating flush mounted engagement on a pair of eyeglasses having a magnet affixed thereto; and c. a magnet affixed to the stem opposite the mirrored surface for magnetically cooperating with an eyeglasses frame for magnetically engaging the mirror, whereby the mirror is fixedly and rotatably adjustably mounted to a pair of eyeglasses, thereby providing for hand adjustment of the rearwardly and fixedly directed line of sight reflected in the mirror.

* * * * *